US010594188B2

(12) United States Patent
Davidson et al.

(10) Patent No.: US 10,594,188 B2
(45) Date of Patent: Mar. 17, 2020

(54) FREE WHEELING MOTOR FAN (71) Applicant: Graco Minnesota Inc., Minneapolis, MN (US)

(72) Inventors: Glen W. Davidson, Roseville, MN (US); Christopher A. Lins, Crystal, MN (US); Bradley K. Voigt, Maple Lake, MN (US); David M. Larsen, Albertville, MN (US); August F. Legatt, Maple Lake, MN (US); Bret A. Deneson, Ostego, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 516 days.

(21) Appl. No.: 14/914,314

(22) PCT Filed: Sep. 4, 2014

(86) PCT No.: PCT/US2014/054010
§ 371 (c)(1),
(2) Date: Feb. 25, 2016

(87) PCT Pub. No.: WO2015/034995
PCT Pub. Date: Mar. 12, 2015

(65) Prior Publication Data
US 2016/0211723 A1 Jul. 21, 2016

Related U.S. Application Data
(60) Provisional application No. 61/873,652, filed on Sep. 4, 2013.

(51) Int. Cl.
H02K 9/06 (2006.01)
B05B 9/04 (2006.01)
(Continued)

(52) U.S. Cl.
CPC ............ *H02K 9/06* (2013.01); *B05B 9/0416* (2013.01); *B05B 9/0861* (2013.01); *H02K 11/30* (2016.01);
(Continued)

(58) Field of Classification Search
CPC ............ H02K 7/10; H02K 7/108; H02K 9/06; H02K 7/00; H02K 7/14; B05B 9/0861;
(Continued)

(56) References Cited
U.S. PATENT DOCUMENTS 1,039,099 A * 9/1912 Wilson .................... A61C 1/05
192/45.018
1,157,408 A 10/1915 Master
(Continued)

FOREIGN PATENT DOCUMENTS

CN 1711208 A 12/2005
CN 101790832 A 7/2010
(Continued)

OTHER PUBLICATIONS

Extended European Search Report for European Patent Application No. 14842167.0. dated Apr. 10, 2017, 8 pages.
(Continued)

Primary Examiner — Burton S Mullins
(74) Attorney, Agent, or Firm — Kinney & Lange, P.A.

(57) ABSTRACT

A motor assembly includes a shaft, an electric motor operatively connected to the shaft to drive the shaft in a first rotational direction, a clutch assembly connected to the shaft, and a fan connected to the clutch assembly and configured to supply the electric motor with cooling air. The clutch assembly drives the fan when the electric motor drives the shaft and allows the fan to freewheel in the first rotational direction when the electric motor is not driving the shaft. A method of operating a fan cooled electric motor
(Continued)

includes energizing the electric motor to drive a shaft in a first rotational direction using the electric motor and de-energizing the electric motor so that it no longer drives the shaft, allowing the fan to freewheel in the first rotational direction.

20 Claims, 4 Drawing Sheets (51) Int. Cl.
    *F16D 41/06*       (2006.01)
    *F16D 15/00*       (2006.01)
    *H02K 7/108*       (2006.01)
    *B05B 9/08*         (2006.01)
    *H02K 11/30*      (2016.01)
    *F01P 7/04*        (2006.01)
    *F01P 5/04*        (2006.01)

(52) U.S. Cl.
    CPC .......... *F01P 7/048* (2013.01); *F01P 2005/046* (2013.01); *F16D 15/00* (2013.01); *F16D 41/06* (2013.01); *H02K 7/108* (2013.01)

(58) Field of Classification Search
    CPC ... B05B 9/0416; F01P 7/048; F01P 2005/046; F04D 13/021; F04D 25/06; F04D 25/068; F04D 25/082; F16D 41/00; F16D 41/06; F16D 1/104; F16D 7/007; F16D 15/00; F16D 41/086; F16D 43/204
    USPC ...... 310/74, 78, 103; 417/410.1, 423.6, 223; 192/41 R–41 A; 222/52, 63, 258, 333; 415/123; 464/150, 182
    See application file for complete search history.

(56) References Cited

U.S. PATENT DOCUMENTS

| | | | | |
|---|---|---|---|---|
| 2,356,590 | A | | 8/1944 | Jacobsen |
| 2,687,249 | A | | 8/1954 | Papanek et al. |
| 2,699,238 | A | * | 1/1955 | Sampatacos .......... F16D 41/066 192/45.019 |
| 2,699,239 | A | | 1/1955 | Klonoski |
| 2,838,243 | A | | 6/1958 | Peters |
| 3,625,633 | A | | 12/1971 | Nelson |
| 3,719,843 | A | * | 3/1973 | Dochterman .......... H02K 9/06 310/62 |
| 3,749,519 | A | * | 7/1973 | Ryba .................... F04D 29/023 416/241 R |
| 4,009,971 | A | * | 3/1977 | Krohn .................. F04B 9/02 417/223 |
| 4,090,785 | A | | 5/1978 | Weninger |
| 4,397,610 | A | * | 8/1983 | Krohn ................ G05D 16/2066 307/118 |
| 4,908,538 | A | | 3/1990 | Geberth, Jr. |
| 5,070,267 | A | | 12/1991 | Sano et al. |
| 5,076,761 | A | * | 12/1991 | Krohn .................. H02H 7/0822 417/18 |
| 5,292,232 | A | * | 3/1994 | Krohn .................. F04B 49/022 200/82 C |
| 5,343,104 | A | * | 8/1994 | Takahashi ............. F04D 29/051 310/67 R |
| 5,557,930 | A | * | 9/1996 | Cakmaz ................ B60K 11/00 123/41.12 |
| 5,617,817 | A | | 4/1997 | Martin |
| 5,701,045 | A | * | 12/1997 | Yokozawa ............ F04D 29/526 310/58 |
| 5,711,483 | A | * | 1/1998 | Hays .................... B05B 12/085 222/63 |
| 5,725,364 | A | * | 3/1998 | Mirazita ............... B05B 9/0403 137/884 |
| 6,037,684 | A | * | 3/2000 | DeYoung ................ H02K 9/06 310/52 |
| 6,079,958 | A | | 6/2000 | Qandil |
| 6,419,456 | B1 | * | 7/2002 | Cooper .................... F04B 17/03 200/82 A |
| 7,426,110 | B2 | * | 9/2008 | Malone ................. F04D 25/022 310/50 |
| 7,866,959 | B2 | * | 1/2011 | Barsun .................... F04D 25/02 417/423.5 |
| 8,662,857 | B2 | * | 3/2014 | Hukriede ................ F04B 17/05 222/315 |
| 2007/0267264 | A1 | * | 11/2007 | Pederson .............. F16D 41/066 192/45.018 |
| 2011/0023448 | A1 | * | 2/2011 | Livernais ................. H02K 7/02 60/39.091 |
| 2012/0175978 | A1 | | 7/2012 | Quiring et al. |
| 2013/0022467 | A1 | | 1/2013 | Watkins |

FOREIGN PATENT DOCUMENTS

| | | | | |
|---|---|---|---|---|
| CN | 102594024 B | | 7/2012 | |
| DE | 3110591 A1 | * | 7/1982 | ............ H02K 7/14 |
| DE | 3808020 A1 | * | 9/1989 | ............ H02K 9/06 |
| DE | 3808030 | * | 9/1989 | ............ H02K 9/06 |
| EP | 0899858 A1 | | 3/1999 | |
| EP | 2019477 A1 | | 1/2009 | |
| EP | 2364952 A1 | | 9/2011 | |
| GB | 2083865 | * | 3/1982 | ............ B60T 17/02 |
| GB | 2083865 A | | 3/1982 | |
| GB | 2422493 A | * | 7/2006 | ............ H05K 1/02 |
| JP | S5519459 U | | 2/1980 | |
| WO | 9201142 | | 1/1992 | |
| WO | WO2004/042484 A2 | | 5/2004 | |
| WO | WO2009/016128 A1 | | 2/2009 | |

OTHER PUBLICATIONS

International Searching Authority, PCT Notification of Transmittal of the International Search Report and he Written Opinion, dated Dec. 16, 2014, 12 pages.
First Chinese Office Action for Chinese Patent Application No. 2014800482163, dated Nov. 3, 2017, 15 pages.
Third Office Action from Chinese Patent Application No. 201480048216.3, dated Dec. 12, 2018, 14 pages.
Chinese Office Action for CN Application No. 2014800482163, dated Jun. 29, 2018, 19 Pages.
Fourth Chinese Office Action for CN Application No. 2014800482163, dated Jun. 14, 2019, pp. 6.
Communication Pursuant to Article 94(3) EPC for EP Application No. 14842167.0, dated Mar. 11, 2019, pp. 6.
Communication Pursuant to Article 94(3) EPC for EP Application No. 14842167.0, dated Nov. 5, 2019, pp. 6.

* cited by examiner

FREE WHEELING MOTOR FAN

BACKGROUND

Paint sprayers and other devices utilize electric motors to rotate a shaft. In the case of paint sprayers, the shaft is sometimes connected to a crankshaft or cam/eccentric to translate the rotational motion of the shaft into a reciprocating motion. The reciprocating motion is transferred to a pump and used to increase system pressure in the paint sprayer. This pressure is used by the paint sprayer to spray and apply paint. Once the system pressure has increased to or above a maximum or stall pressure, the electric motor is powered off. As the paint is sprayed, the system pressure in the paint sprayer drops. Once the system pressure has decreased to or below a designated level, the electric motor is powered back on to resupply the paint sprayer with maximum pressure. In some paint spraying systems, the electric motor that supplies pressure to the paint sprayer operates solely based on the paint sprayer system pressure and doesn't "know" when an operator starts and stops spraying paint.

A cooling device is needed to keep the electric motor from exceeding its temperature rating during use. In some cases, a fan is connected to the shaft rotated by the electric motor and provides cooling air to the electric motor by drawing air through and/or around the motor. Depending on the configuration and parameters of the paint spraying operation, the electric motor can be powered on and off frequently, often more frequently than the number of trigger presses an operator makes with a spraygun. Frequently powering the electric motor off and on increases the heat rise and temperature of the electric motor. Fans that are directly connected to the shaft rotate only when the electric motor is powered. These configurations are designed to provide adequate cooling at maximum power/maximum air flow, but do not always provide enough cooling to the electric motor when frequent starting and stopping cycles are used. In other cases, thermostatically or electrically controlled clutches allow the fan to continue to provide cooling when the electric motor is not receiving power. Alternatively, independently powered fans can provide cooling to the electric motor. In the latter two cases, these additional components increase system cost and complexity.

SUMMARY

A motor assembly includes a shaft, an electric motor operatively connected to the shaft to drive the shaft in a first rotational direction, a clutch assembly connected to the shaft, and a fan connected to the clutch assembly and configured to supply the electric motor with cooling air. The clutch assembly drives the fan when the electric motor drives the shaft and allows the fan to freewheel in the first rotational direction when the electric motor is not driving the shaft.

A method of operating a fan cooled electric motor includes energizing the electric motor to drive a shaft in a first rotational direction using the electric motor. The shaft is connected to a fan by a clutch assembly that allows the fan to freewheel in the first rotational direction when the shaft is not being driven by the electric motor. The fan supplies the electric motor with cooling air as the fan rotates in the first direction. The method also includes de-energizing the electric motor so that it no longer drives the shaft, allowing the fan to freewheel in the first rotational direction.

DETAILED DESCRIPTION

The present disclosure describes a fan cooled electric motor having a freewheeling fan. The fan is connected to the tail shaft of the electric motor and is able to provide cooling to the electric motor after the electric motor is de-energized and the shaft is no longer being driven by the electric motor. When the shaft is not being driven by the electric motor, the fan is allowed to freewheel so that it continues to provide cooling air to the electric motor. The present disclosure is described with respect to a fan cooled electric motor in a paint spraying system. Other systems that employ a fan cooled electric motor with frequent on/off cycles can be expected to also receive the benefits described herein.

Figure 1:
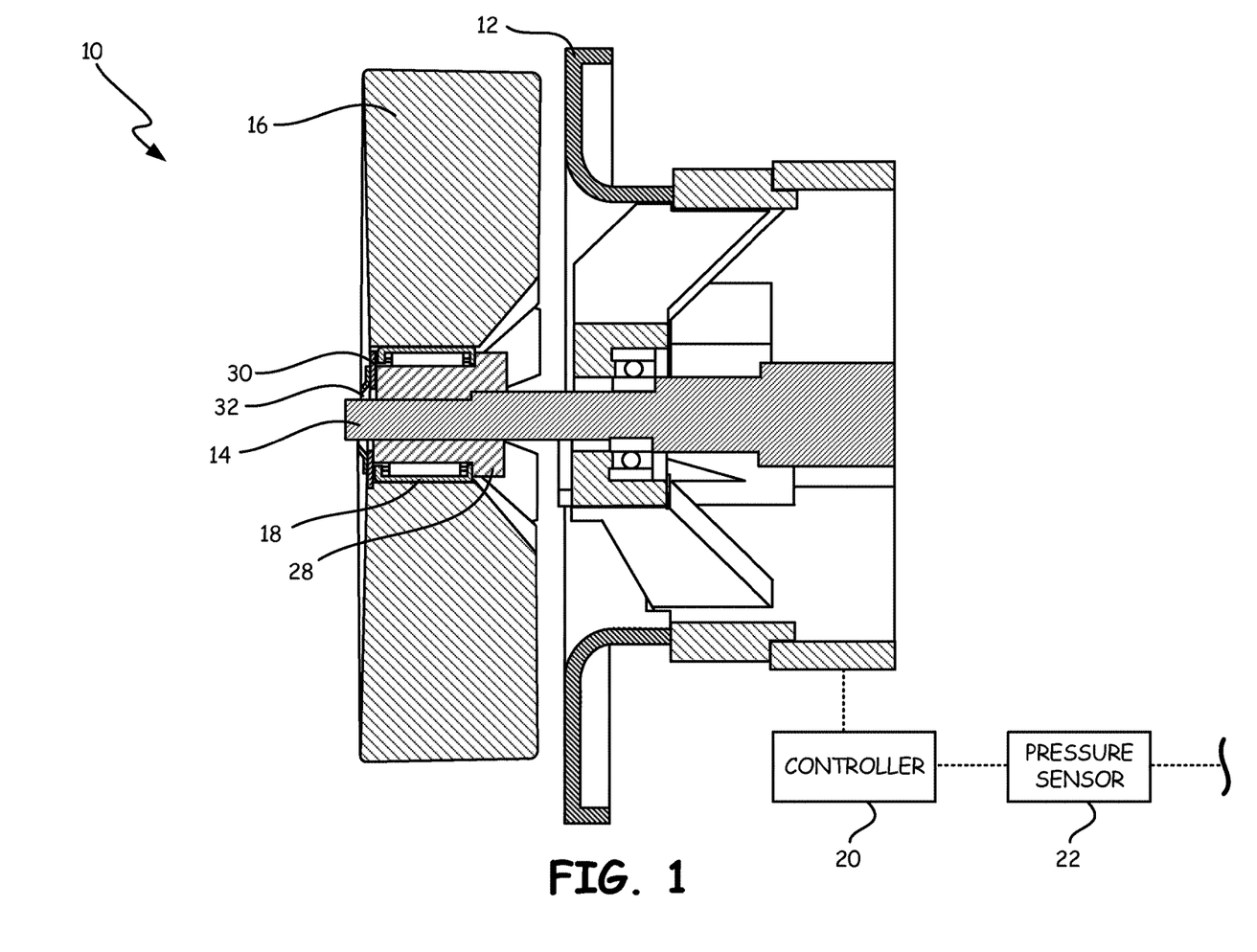
FIG. 1 is a cross section view of one embodiment of a fan cooled electric motor with a freewheeling fan.
Figure 2:
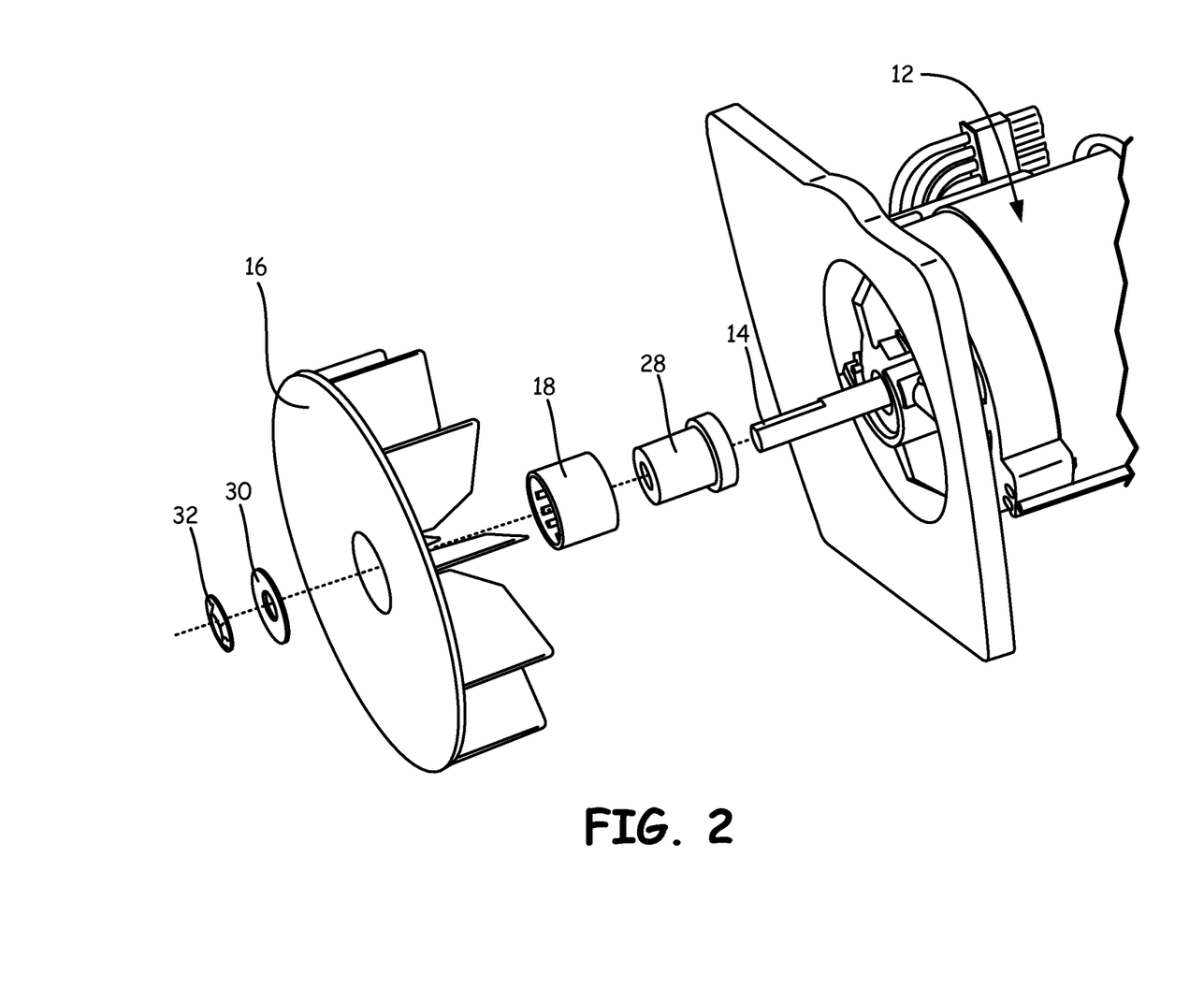
FIG. 2 is an exploded view of the fan cooled electric motor of FIG. 1.
Figure 3:
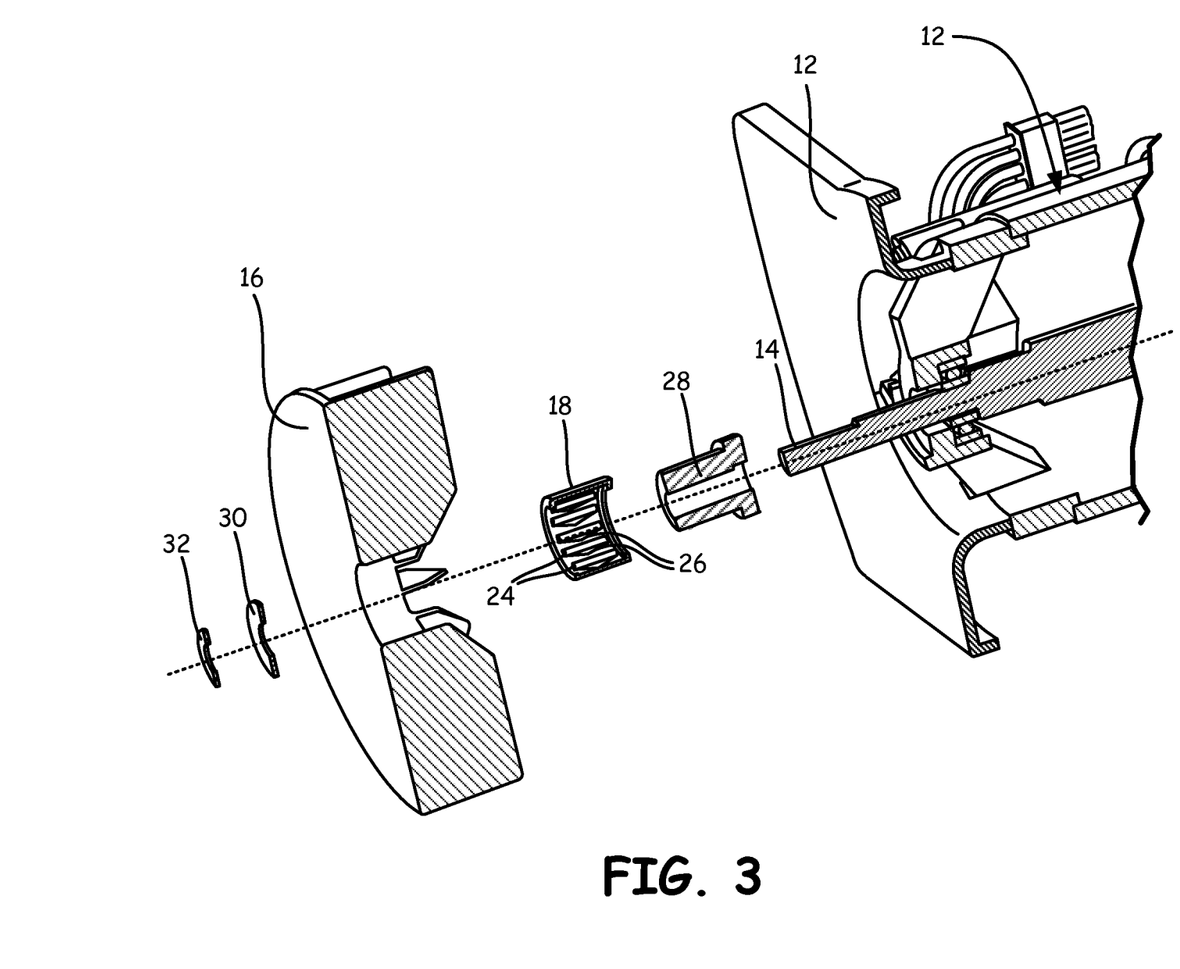
FIG. 3 is a cross section view of the fan cooled electric motor of FIG. 2.

FIGS. 1-3 illustrate one embodiment of a fan cooled electric motor having a freewheeling fan. FIG. 1 is a cross section view, FIG. 2 is an exploded view, and FIG. 3 is a cross section of FIG. 2. Fan cooled electric motor 10 includes electric motor 12, shaft 14, fan 16 and clutch assembly 18. Electric motor 12 is configured to rotate shaft 14. Electric motor 12 receives electrical energy from an energy source (not shown). When electric motor 12 is energized, electric motor 12 drives shaft 14, turning shaft 14 in a rotational direction about a longitudinal axis. When electric motor 12 is de-energized, electric motor 12 ceases to drive shaft 14, allowing shaft 14 to decelerate its rotation over time. One end of shaft 14 contains a gear (not shown) that is used to drive a gear belonging to another system (e.g., a paint spraying system). Depending on the end use of the system receiving the output from electric motor 12, electric motor 12 can be energized and de-energized several times a minute. For example, in one paint sprayer system, electric motor 12 is cycled on (energized) and off (de-energized) as many as one hundred times per minute.

In some embodiments, electric motor 12 is configured to operate with a "soft start". In a soft start system, controller 20 (shown in FIG. 1) meters power to electric motor 12 so that electric motor 12 starts driving shaft 14 before the maximum amount of energy is supplied to electric motor 12. Controller 20 determines when electric motor 12 drives shaft 14. In some embodiments, pressure sensor 22 is used to determine whether electric motor 12 should drive or should not drive shaft 14. Information from pressure sensor 22 is sent to controller 20 so that electric motor is energized or de-energized at the proper times.

During tests, the Applicant found that most of the heat generated by electric motor 12 is formed when energy is first being supplied to electric motor 12 rather than when electric motor 12 is energized at maximum power for an extended period of time. Electric motor 12 typically was hottest when it was barely running but restarting often. Electric motors 12 operating with a soft start also demonstrated this effect.

Once the temperature of electric motor 12 reaches a threshold maximum value (i.e. the temperature rating of the electric motor), electric motor 12 automatically shuts down to prevent irreversible damage. Cooling air is provided to electric motor 12 by fan 16 to reduce its temperature during operation.

Fan 16 is connected to the opposite end of shaft 14 from the gear described above. Fan 16 rotates along with shaft 14 when electric motor 12 is energized. Fan 16 can be a centrifugal fan as shown in FIG. 1. Alternatively, fan 16 can be an axial fan, a crossflow fan or any other apparatus for removing motor heat. The blades of fan 16 are arranged to provide cooling air to electric motor 12 when fan 16 is rotating by drawing cooling air through and around electric motor 12. In some embodiments, fan cooled electric motor 10 is housed within a duct or housing, or is mounted within the motor itself, so that cooling air is better directed to and/or through electric motor 12 and heat is drawn away from electric motor 12.

Clutch assembly 18 connects fan 16 to shaft 14. Clutch assembly 18 allows fan 16 to freewheel for a period of time after electric motor 12 is de-energized and no longer drives shaft 14. Once electric motor 12 is de-energized, it stops driving shaft 14. Shaft 14 will continue to rotate, but as it is no longer driven by electric motor 12, the rotational speed of shaft 14 decreases. Clutch assembly 18 allows fan 16 to continue to rotate faster than shaft 14 due to the mass of clutch assembly 18 and fan 16. Clutch assembly 18 allows fan 16 to freewheel in only one direction, the direction shaft 14 rotates. This configuration allows shaft 14 to drive fan 16 when electric motor 12 is energized and allows fan 16 to continue rotating once electric motor 12 has been de-energized so that fan 16 continues to provide cooling air to electric motor 12.

Clutch assembly 18 can be a roller clutch, a sprag clutch or a series of ratchets. Each of these structures allows rotation in a single direction while preventing rotation in the opposite direction. For example, in the embodiment shown in FIGS. 1-3, clutch assembly 18 is a roller clutch. As shown best in FIG. 3, clutch assembly 18 includes matched roller bearings 24 and ramps 26. Roller bearings 24 are cylindrical bearings spaced about the inner circumference of clutch assembly 18. A ramp 26 is located next to each roller bearing 24. Ramps 26 engage with their matched roller bearings 24 when they rotate in one direction but do not engage with roller bearings 24 when they rotate in the opposite direction. When ramp 26 engages with roller bearing 24, roller bearing 24 is locked to prevent rotation. Ramps 26 thereby prevent roller bearings 24 from rotating in one direction but allow roller bearings 24 to rotate in the opposite direction.

In some embodiments, fan 16 is molded onto clutch assembly 18 such that an inner diameter of fan 16 is formed around an outer diameter of clutch assembly 18. In other embodiments, clutch assembly 18 is attached to fan 16 by an adhesive or a fastener, such as a set screw. In still other embodiments, clutch assembly 18 is interference fit onto fan 16.

Clutch assembly 18 can interact directly with shaft 14 or with an adapter located on shaft 14. In some embodiments, clutch assembly 18 is connected to shaft 14 by shaft adapter 28. Shaft adapter 28 can eliminate the need for a shaft 14 that is sized to interact with clutch assembly 18 directly. This allows shaft 14 to be thinner and generally less expensive to manufacture. Shaft adapter 28 can be connected to shaft 14 by a fastener, such as a set screw, and/or by matching a "D" shaped end of shaft 14 with a corresponding internal shape of shaft adapter 28 (as shown in FIGS. 1-3). A fastener can prevent both rotational and axial movement of shaft adapter 28 relative to shaft 14. A "D" shaped shaft 14 and shaft adapter 28 can prevent rotational movement of shaft adapter 28 relative to shaft 14. In these embodiments, axial movement of shaft adapter 28 (in addition to clutch assembly 18 and fan 16) relative to shaft 14 is prevented by shim 30 and clip 32 as shown in FIGS. 1-3.

Shaft adapter 28 can also eliminate the need for shaft 14 to be constructed of a wear-resistant material that will not cause damage to roller bearings 24. In some embodiments, shaft adapter 28 is made of hardened stainless steel. In other embodiments, shaft adapter 28 is made of sintered powder metal that has been impregnated with oil. Each of these materials is less likely to wear prematurely or cause damage to roller bearings 24 than some other materials. Constructing shaft adapter 28 of these materials rather than the entirety of shaft 14 can reduce material and manufacturing cost and manufacturing complexity.

Fan 16 and clutch assembly 18 are sized and rated so that the fan has a rotational moment of inertia to provide an appreciable number of freewheeling rotations when electric motor 12 is de-energized. At the same time, the size of the fan must not be so massive that it causes excessive clutch slippage when electric motor 12 is energized during a subsequent "on" cycle. Slippage causes roller wear and heating, which can reduce the life of roller bearings 24. Fan 16 can be sized (and though not as significant as fan size, clutch assembly 18 can be rated) to obtain a desired amount of freewheeling. In one embodiment, fan 16 is sized to freewheel for at least one second after electric motor 12 has stopped driving shaft 14. In other embodiments, fan 16 is sized to freewheel for at least four seconds after electric motor 12 has stopped driving shaft 14. In another embodiment, clutch assembly 18 is rated to allow fan 16 to freewheel for between at least one second after electric motor 12 has stopped driving shaft 14. In other embodiments, clutch assembly 18 is rated to allow fan 16 to freewheel for at least four seconds after electric motor 12 has stopped driving shaft 14.

Figure 4:
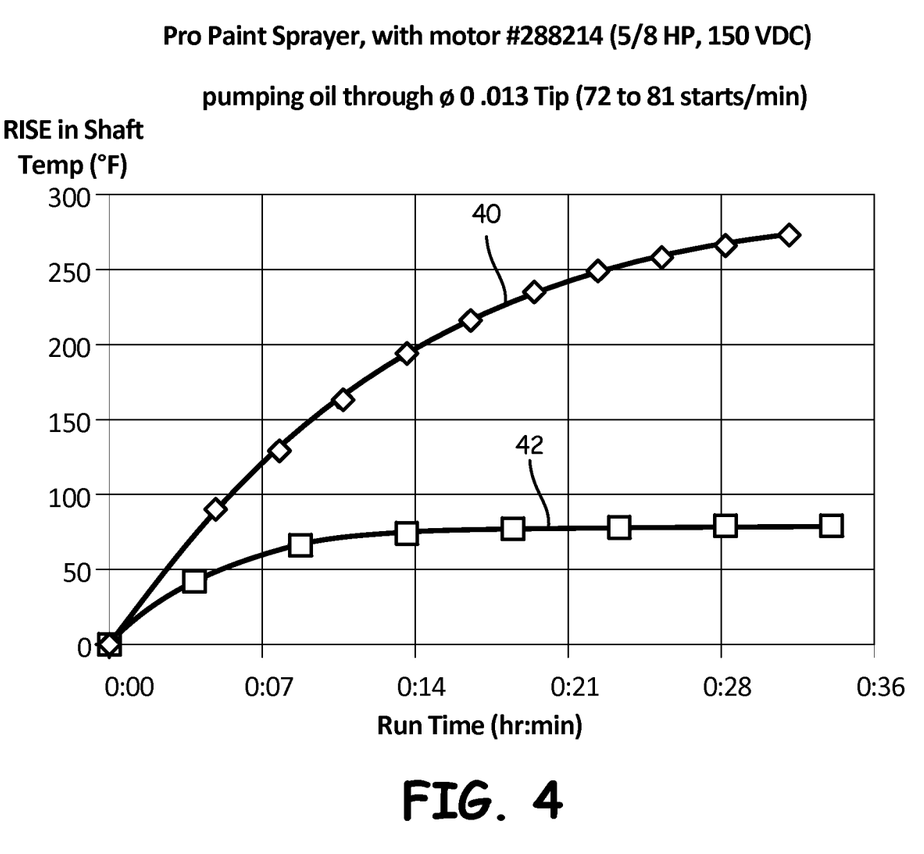
FIG. 4 is a graph illustrating operating temperatures of a fan cooled electric motor with a fixed fan and fan cooled electric motor with a freewheeling fan.

FIG. 4 is a graph demonstrating the temperatures of a fan cooled electric motor with a freewheeling fan and a fixed fan. An electric motor was connected to a paint sprayer that sprayed oil based paint. The electric motor cycled on and off between 72 and 81 times per minute during the test. The same electric motor was used in both tests. Temperatures were obtained from a temperature sensor located in the electric motor shaft.

In one test, a fan was fixed to the electric motor's shaft. The fan was not allowed to freewheel and instead rotated only when the electric motor drove the shaft. Curve 40 shows the temperature of the electric motor with a fixed fan. After about thirty minutes the test was stopped because the temperature exceeded the electric motor's temperature rating and the motor automatically shut down. The rise in temperature using the fixed fan was 134° C. (273° F.).

In another test, fan 16 and clutch assembly 18 as described herein were affixed to the electric motor's shaft. Fan 16 was allowed to freewheel as described herein. Curve 42 shows the temperature of the electric motor with a freewheeling fan. The rise in temperature using the freewheeling fan was 26° C. (79° F.). The freewheeling fan test was able to continue past thirty minutes as the temperature never approached the electric motor's temperature rating. As shown in FIG. 4, the temperature during the freewheeling fan test did not rise near the level of the fixed fan and was significantly lower than expected.

In addition to fan cooled electric motor 10, the present disclosure also describes a method of operation. A method of operating a fan cooled electric motor includes energizing electric motor 12 to drive shaft 14 in a first rotational direction. Since shaft 14 is connected to fan 16 by clutch assembly 18, fan 16 is allowed to freewheel in the first rotational direction when shaft 14 is not being driven by electric motor 12. Fan 16 supplies electric motor 12 with cooling air as fan 16 rotates in the first direction. The method also includes de-energizing electric motor 12 so that it no longer drives shaft 14, allowing fan 16 to freewheel in the first rotational direction. The cycle of energizing electric motor 12 (driving fan 16) and de-energizing electric motor 12 (allowing fan 16 to freewheel) is repeated. In one embodiment, the steps of energizing electric motor 12 and de-energizing electric motor 12 occur sequentially at a rate between 2 and 100 cycles per minute Although the present invention has been described with reference to preferred embodiments, workers skilled in the art will recognize that changes may be made in form and detail without departing from the spirit and scope of the invention.

The invention claimed is:

1. A motor assembly for a fluid spraying system, the motor assembly comprising:
   a shaft extending along an axis;
   an electric motor operatively connected to the shaft to drive the shaft in a first rotational direction, wherein a first end of the shaft is configured to provide rotational power to a component of the spraying system configured to output a pumped fluid under pressure;
   a clutch assembly connected to an end of the shaft opposite the first end;
   a shaft adapter connecting the clutch assembly to the shaft, wherein the shaft adapter has a first diameter and the clutch assembly has a second diameter, the second diameter being larger than the first diameter;
   a pressure sensor configured to sense a fluid-pressure of the pumped fluid;
   a controller configured to energize, based on the sensed fluid pressure, the electric motor such that the electric motor drives the shaft and to de-energize, based on the sensed fluid pressure, the electric motor such that the electric motor does not drive the shaft; and
   a fan connected to the clutch assembly and configured to supply the electric motor with cooling air, wherein the clutch assembly drives the fan when the electric motor drives the shaft and allows the fan to freewheel in the first rotational direction when the electric motor is not driving the shaft;
   wherein the clutch assembly is a roller clutch that includes a clutch body, roller bearings supported and retained by the clutch body, and ramps formed on the clutch body;
   wherein the roller bearings are cylindrical and axially elongate;
   wherein the ramps are configured to engage the roller bearings to transfer torque from the electric motor to the fan and the ramps are configured to disengage from the roller bearings to allow the fan to freewheel.

2. The motor assembly of claim 1, wherein the fan is one of a centrifugal fan and an axial fan.

3. The motor assembly of claim 1, wherein a portion of the shaft adapter contacting the clutch assembly is formed from stainless steel.

4. The motor assembly of claim 1, wherein a portion of the shaft adapter contacting the clutch assembly is formed from sintered powder metal impregnated with an oil.

5. The motor assembly of claim 1, wherein the fan is molded onto the clutch assembly.

6. The motor assembly of claim 1, wherein the fan is sized to freewheel in the first direction for at least one second after the electric motor stops driving the shaft.

7. The motor assembly of claim 6, wherein the fan is sized to freewheel in the first direction for at least four seconds after the electric motor stops driving the shaft.

8. The motor assembly of claim 1, wherein the clutch assembly allows the fan to freewheel in the first direction for at least one second after the electric motor stops driving the shaft.

9. The motor assembly of claim 8, wherein the clutch assembly allows the fan to freewheel in the first direction for at least four seconds after the electric motor stops driving the shaft.

10. The motor assembly of claim 1, wherein the controller regulates a speed at which the electric motor drives the shaft.

11. The motor assembly of claim 1, wherein the fan rides directly on the clutch assembly and the clutch assembly rides directly on the shaft adapter.

12. The motor assembly of claim 1, wherein the first end of the shaft includes an external contour and the shaft adapter includes an internal shape corresponding to and configured to receive the external contour, wherein the shaft transfers torque to the shaft adapter by the external contour interfacing with the internal shape to drive rotation of the shaft adapter in the first rotational direction.

13. The motor assembly of claim 1, wherein a hub of the fan receiving the clutch assembly has a third diameter, the third diameter larger than the second diameter.

14. A paint spraying system comprising:
   a motor assembly comprising:
      a shaft extending along an axis;
      an electric motor operatively connected to the shaft to drive the shaft in a first rotational direction;
      a clutch assembly connected to a first end of the shaft;
      a shaft adapter connecting the clutch assembly to the shaft, wherein the shaft adapter has a first diameter and the clutch assembly has a second diameter, the second diameter being larger than the first diameter;
      a sensor configured to sense a fluid pressure of a pumped paint;
      a controller configured to determine whether the electric motor drives the shaft or does not drive the shaft based on the sensed fluid pressure from the sensor; and
   a fan connected to the clutch assembly and configured to supply the electric motor with cooling air, wherein the clutch assembly drives the fan when the electric motor drives the shaft and allows the fan to freewheel in the first rotational direction when the electric motor is not driving the shaft;
      wherein the clutch assembly is a roller clutch that includes a clutch body, roller bearings supported and retained by the clutch body, and ramps formed on the clutch body;
      wherein the roller bearings are cylindrical and axially elongate;
      wherein the ramps are configured to engage the roller bearings to transfer torque from the electric motor to the fan and the ramps are configured to disengage from the roller bearings to allow the fan to freewheel;

wherein an end of the shaft opposite the clutch assembly is configured to output a rotational power to drive pumping of the paint through the spraying system; and wherein the motor assembly increases the fluid pressure in a component of the paint spraying system by driving the shaft in the first rotational direction to thereby power the spraying system.

15. A method of operating a fan cooled electric motor in a fluid spraying system:

energizing the electric motor to drive a shaft in a first rotational direction about an axis using the electric motor, wherein a first end of the shaft is connected to a fan by a clutch assembly that allows the fan to freewheel in the first rotational direction when the shaft is not being driven by the electric motor, and the second end of the shaft is connected to a component of the spraying system to cause the component to output a pressurized fluid, and wherein the fan blows cooling air over the electric motor as the fan rotates in the first direction; and de-energizing the electric motor so that it no longer drives the shaft, allowing the fan to freewheel in the first rotational direction;

wherein the electric motor is energized or de-energized based on a sensed pressure of the pressurized fluid;

wherein a shaft adapter connects the clutch assembly to the shaft, wherein the shaft adapter has a first diameter and the clutch assembly has a second diameter, the second diameter being larger than the first diameter;

wherein the clutch assembly is a roller clutch that includes a clutch body, roller bearings supported and retained by the clutch body, and ramps formed on the clutch body;

wherein the roller bearings are cylindrical and axially elongate; and wherein the ramps are configured to engage the roller bearings to transfer torque from the electric motor to the fan and the ramps are configured to disengage from the roller bearings to allow the fan to freewheel.

16. A method of operating a fan cooled electric motor in a fluid spraying system:

energizing, by a controller, the electric motor to drive a shaft in a first rotational direction using the electric motor, wherein a first end of the shaft is connected to a fan by a clutch assembly that allows the fan to freewheel in the first rotational direction when the shaft is not being driven by the electric motor, and the second end of the shaft is connected to drive a component of the spraying system to cause the component to output a pressurized fluid, and wherein the fan supplies the electric motor with cooling air as the fan rotates in the first direction; and de-energizing, by the controller the electric motor so that it no longer drives the shaft, allowing the fan to freewheel in the first rotational direction;

wherein the steps of energizing the electric motor and de-energizing the electric motor occur sequentially at a rate between 2 and 100 cycles per minute; and wherein a shaft adapter connects the clutch assembly to the shaft, wherein the shaft adapter has a first diameter and the clutch assembly has a second diameter, the second diameter being larger than the first diameter;

wherein the clutch assembly is a roller clutch that includes a clutch body, roller bearings supported and retained by the clutch body, and ramps formed on the clutch body;

wherein the roller bearings are cylindrical and axially elongate; and wherein the ramps are configured to engage the roller bearings to transfer torque from the electric motor to the fan and the ramps are configured to disengage from the roller bearings to allow the fan to freewheel.

17. A motor assembly for a paint spraying system comprising:

a shaft extending axially between a first end and a second end;

an electric motor operatively connected to the shaft to drive the shaft in a first rotational direction to cause the shaft to provide rotational power by the second end of the shaft to the paint spraying system for pumping pressurized paint in the paint spraying system;

a clutch assembly connected to the first end of the shaft;

a shaft adapter connecting the clutch assembly to the shaft, wherein the shaft adapter has a first diameter and the clutch assembly has a second diameter, the second diameter being larger than the first diameter a fan connected to the clutch assembly and configured to blow cooling air over the electric motor, wherein the clutch assembly drives the fan when the electric motor drives the shaft and allows the fan to freewheel in the first rotational direction when the electric motor is not driving the shaft; and a controller configured to energize and de-energize the electric motor sequentially at a rate between 2 and 100 cycles per minute wherein the clutch assembly is a roller clutch that includes a clutch body, roller bearings supported and retained by the clutch body, and ramps formed on the clutch body;

wherein the roller bearings are cylindrical and axially elongate; and wherein the ramps are configured to engage the roller bearings to transfer torque from the electric motor to the fan and the ramps are configured to disengage from the roller bearings to allow the fan to freewheel.

18. The motor assembly of claim 17, wherein the controller is configured to energize and de-energize the motor based on a sensed fluid pressure of the pressurized paint from a sensor.

19. A method of operating a fan cooled electric motor for a paint sprayer:

energizing, by a controller, the electric motor to drive a shaft in a first rotational direction about an axis using the electric motor, wherein a first end of the shaft is connected to a fan by a clutch assembly that allows the fan to freewheel in the first rotational direction when the shaft is not being driven by the electric motor, and a second end of the shaft is connected to the paint sprayer to cause the paint sprayer to output pressurized paint, and wherein the fan supplies the electric motor with cooling air as the fan rotates in the first direction; and de-energizing, by the controller, the electric motor so that it no longer drives the shaft, allowing the fan to freewheel in the first rotational direction;

sensing a pressure of the pressurized paint;

wherein a shaft adapter connects the clutch assembly to the shaft, wherein the shaft adapter has a first diameter and the clutch assembly has a second diameter, the second diameter being larger than the first diameter;

wherein the clutch assembly is a roller clutch that includes a clutch body, roller bearings supported and retained by the clutch body, and ramps formed on the clutch body;

wherein the roller bearings are cylindrical and axially elongate;

wherein the ramps are configured to engage the roller bearings to transfer torque from the electric motor to the fan and the ramps are configured to disengage from the roller bearings to allow the fan to freewheel; and wherein the controller energizes and de-energizes the electric motor based on the sensed paint pressure.

20. A motor assembly comprising:

a shaft extending along an axis;

an electric motor operatively connected to the shaft to drive the shaft in a first rotational direction, wherein a first end of the shaft powers a paint sprayer configured to output a pumped fluid under pressure;

a clutch assembly connected to an end of the shaft opposite the paint sprayer;

a shaft adapter connecting the clutch assembly to the shaft, wherein the shaft adapter has a first diameter and the clutch assembly has a second diameter, the second diameter being larger than the first diameter;

a sensor configured to sense a fluid pressure of the pumped fluid output by the paint sprayer;

a controller configured to increase power to the electric motor, based on the sensed fluid pressure, such that the electric motor drives the shaft and to shut off power to the electric motor, based on the sensed fluid pressure, such that the electric motor does not drive the shaft; and a fan connected to the clutch assembly and configured to supply the electric motor with cooling air, wherein the clutch assembly drives the fan when the electric motor drives the shaft and allows the fan to rotate relative to the shaft in the first rotational direction when the electric motor does not drive the shaft;

wherein the clutch assembly is a roller clutch that includes a clutch body, roller bearings supported and retained by the clutch body, and ramps formed on the clutch body;

wherein the roller bearings are cylindrical and axially elongate; and wherein the ramps are configured to engage the roller bearings to transfer torque from the electric motor to the fan and the ramps are configured to disengage from the roller bearings to allow the fan to freewheel.

* * * * *